United States Patent [19]

Nici

[11] Patent Number: 5,351,286
[45] Date of Patent: Sep. 27, 1994

[54] METHOD AND SYSTEM FOR BILLING AN ISDN DATA USER INTERCONNECTION TO THE PUBLIC SWITCHED TELEPHONE NETWORK

[75] Inventor: Richard J. Nici, Tinton Falls, N.J.

[73] Assignee: Bell Communications Research, Inc., Livingston, N.J.

[21] Appl. No.: 87,441

[22] Filed: Jul. 6, 1993

Related U.S. Application Data

[63] Continuation-in-part of Ser. No. 21,383, Feb. 23, 1993, abandoned.

[51] Int. Cl.$^5$ .................. H04M 11/00; H04M 15/00; H04M 17/00
[52] U.S. Cl. ........................................ 379/94; 379/95; 379/112; 379/115; 379/116; 379/144
[58] Field of Search .................. 379/91, 93, 94, 95, 379/112, 115, 144, 116; 370/60, 60.1, 94.1, 94.2, 110.1

[56] References Cited

U.S. PATENT DOCUMENTS

| | | | |
|---|---|---|---|
| 4,975,910 | 12/1990 | Onder | 370/94.1 |
| 5,103,475 | 4/1992 | Shuen | 379/116 |
| 5,131,027 | 7/1992 | Hird et al. | 379/112 |
| 5,214,650 | 5/1993 | Renner et al. | 370/110.1 |
| 5,220,560 | 6/1993 | Ogasawara | 370/110.1 |

OTHER PUBLICATIONS

The article "Primary Access Corporation", 10070 Carroll Canyon Road, San Diego, Calif. 92131; System Profile, Version 1.2, Jul. 1989.

Primary Examiner—Curtis Kuntz
Assistant Examiner—Jason Chan
Attorney, Agent, or Firm—Leonard Charles Suchyta; Joseph Giordano

[57] ABSTRACT

A method and system are provided for connecting and billing a first user on an Integrated Services Digital Network to a second user on a voice-band network for packet data and circuit switched data connections. A network access device is used to extract the first user's billing information and the called party's phone number from the data packets received in the case of data packet transmission and call set-up messages received on an ISDN interface in the case of circuit switched digital connections. A voice-band call to the second user is transmitted over the voice-band network. The billing identification sent by the first user is used to bill the first user for the voice-band call established from the network access device over the public switched telephone network to the second user.

26 Claims, 6 Drawing Sheets

METHOD AND SYSTEM FOR BILLING AN ISDN DATA USER INTERCONNECTION TO THE PUBLIC SWITCHED TELEPHONE NETWORK

RELATED APPLICATION

This application is a continuation-in-part of application Ser. No. 07/021,383 filed on Feb. 23, 1993 entitled "Method and System for Connecting a User on a Packet Network to a User on a Voice-Band Network", now abandoned.

TECHNICAL FIELD

This invention relates to an effective method and apparatus establishing data connections for computer and/or terminal users on an Integrated Services Digital Network (ISDN) to computer and/or terminal users on a voice-band telephone network.

BACKGROUND ART

It is common practice for a first user on a voice-band telephone network to engage in data communication with a second user on a data network. Usually, these instances involve communication between a first user on the public switched telephone network and a second user on a packet network. The first user's terminal activates a modem which initiates a telephone call and converts the first user's data into voice-band signals. These voice-band signals are transmitted over the telephone network and are in turn converted to data by a modem connected to the packet network. As with most telephone calls, the entire local carrier and long distance costs of the associated voice-band call are generally allocated to the initiator of the call.

Other billing scenarios are possible. For example, U.S. Pat. No. 4,796,292 issued to Thomas discloses several methods whereby the costs of data transmission over a voice-band network can be allocated to the receiving party rather than the initiator of the call. The Thomas patent is specifically directed to the situation where a merchant uses a credit-card reader and model to verify the credit of a card-holder via a data transmission to the credit card company over a voice-hand network.

Problems in call cost allocation arise in an environment where a data connection requires interworking and interconnection between the voice band network and data connections within the ISDN. As an example, a first user on a packet network, such as in Integrated Services Digital Network (or ISDN), has connected his terminal to an ISDN end office via a digital Basic Rate Interface (or BRI) line and needs to establish a data connection with a second user on a voice-band telephone network using a modem. For the data from the first terminal to reach the second user, a call must be first initiated from the packet network user to a device that can make a call on the voice-band network and that can translate the data packets from the packet network to voice-band data signals. Similarly, voice-band data from the second user must be converted to data packets for transfer to the first user.

While the problem described above affects data transfer and interworking using packet capabilities, ISDN also provides a user with a circuit switched digital transmission capability. In a circuit-switched interconnection environment, similar cost allocation problems arise when a call originator on an ISDN establishes a circuit switched data connection to a second data user on the Public Switched Telephone Network (PSTN) using a modem. For the data from the first terminal to reach the second user, a call must be initiated by the first user through the ISDN to a device that can establish the connection over the voice band network and then make the translation from the digital data information to voice band data signals compatible with data modem traffic. Similarly, voice band data from the second user must be converted to digital data compatible with the circuit switched digital connection to the originating caller.

The cost allocation problem arises since the billing identity of the first user may not be readily ascertainable by the voice-band network. The costs of the voice-band call would generally be billed to the device which initiates the voice-band call such as a modem or modem pool, rather than the first or ISDN user. A cost effective method of connecting the first ISDN user to the second voiceband user is necessary which allows for call cost allocation to the true initiating party.

Regional telephone companies have attempted two methods of interconnection involving this packet to voice-band connection scenario. The first method is shown in FIG. 1. In this configuration, the ISDN end office 10 associated with the first user 12 with terminal 14 connected to customer premises equipment terminal adaptor (TA) 16 has implemented a modem pool consisting of ISDN terminal adapters 18 paired with multifunction modems 20. This allows the ISDN user to make a voiceband call via the public switched telephone network (or PSTN) 22 to the Plain Old Telephone Service (or POTS) end office switch 24 and POTS user 20 via terminal 28 and modem 30.

The drawbacks to this first method are that the method is expensive: it requires a special port card in the ISDN switch, a full function terminal adapter and a modem for every port in the modem pool; it requires a modem pool at every ISDN end office that will offer this service; the average usage rate of a modem pool is low; and having a distributed modem pool requires many more idle modems than a centralized modem pool would require.

Further, this method is disadvantageous since it requires the user to dial out in two stages, first to dial the local modem pool, and then to dial the POTS user.

The second method, currently used by several regional telephone companies, is shown in FIG. 2. In this method, the data call from the first user 40 connected to ISDN end office switch 46 via terminal 42 and terminal adaptor 44 is routed through the Public Packet Switch Network (PPSN) 48 to a modem pool that the PPSN normally provides. This modem pool, consisting of individual modems 50, can then create the voice-band call needed to access a second user 60 on the PSTN 52 via POTS end office switch 54, modem 56 and terminal 58.

The drawback to this method is that the modem pool is billed for the voice-band call, not the call initiator, in this case ISDN user 40. The regional telephone companies have tried to work around this problem by only allowing dial out within Local Access and Transport Areas (or LATA). Intra-LATA calls are non-toll calls which would normally not be charged to the ISSN user. This solution severely limits the number of POTS users that can be reached since POTS users outside of the LATA can not be reached.

In addition, regional telephone companies have tried setting up separate modem pools for each ISDN customer. However, this solution requires too many modem pools for individual users and, when used for large businesses, does not allow for the business to bill individual users or departments for the voice-band portion of calls which they initiate.

The problems identified above as a result of using modem pools for interconnection between users on a packet network and users on the voice-band network also apply to instances of interworking between circuit switched digital data users and voice-band data users.

SUMMARY OF THE INVENTION

It is thus a general object of the present invention to provide a method and system for connecting a first data user on an ISDN to a second user on a voice-band network.

An additional object of the present invention is to provide a method and system for connecting a first data user on an ISDN to a second user on a voice-band network such that the costs of the voice-band portion of the communication are billed to the first user.

A further object of the present invention is to provide a method and system for connecting a first data user on an ISDN to a second user on a voice-band network wherein the billing identification corresponding to a billing account of the first user is transferred to a the voice-band network for the purposes of allocating the costs of the voice-band portion of the communication.

Moreover, an object of the present invention is to provide a method and system for connecting a first data user on an ISDN to a second user on a voice-band network which does not require a modem pool at each end office of the digital data network.

In addition, an object of the present invention is to provide a method and system for screening and connecting a first data user on an ISDN to a second user on a voice-band network only if the first user is authorized to engage in such a connection.

An object of the present invention is also to provide a method and system for screening and connecting a first data user on an ISDN to a second user on a voice-band network only if the first user is authorized to initiate the connection with the second user.

In carrying out the present invention, a method is provided for connecting and billing a first user on an ISDN being capable of transmitting digital data communication, the first user having a billing identification corresponding to a billing account, to a second user on a voice-band network, the voice-band network being capable of allocating the costs of a voice-band call. The method includes the step of decoding a data packet from a packet communication initiated by the first user or decoding a call set-up message on the ISDN signalling channel initiated by a first user establishing a circuit switched connection to determine the first user's billing identification. The method also includes the steps of transmitting a voice-band call to the second user over the voice-band network and transmitting the billing identification to the voice-band network such that the voice-band call is billable to the first user's billing account.

Moreover, in carrying out the present invention, in certain embodiments a system is provided for connecting and billing a first user on a packet network being capable of transmitting packet communications, the first user having a billing identification corresponding to a billing account, to a second user on a voice-band network, the voice-band network being capable of allocating the costs of a voice-band call. Decoding means capable of communication with the packet network for decoding a data packet from a packet communication initiated by the first user are provided to determine the first user's billing identification.

Moreover, in carrying out my invention in other embodiments, a system is provided for connecting and billing a first user on a circuit switched data connection being capable of transmitting digital data information, the first user having a billing identification corresponding to a billing account, to a second user on a voice-band network, the voice-band network being capable of allocating the costs of a voice-band call. My system further includes decoding means capable of extracting from a call set-up message the first user's billing identification.

Further, the system includes first transmitting means responsive to the decoding means for transmitting a voice-band call to the second user over the voice-band network. Such a transmitting means in the instance of a circuit switched digital connection interworking scenario includes a rate adaption protocol for adapting the transmission rate of the circuit switched digital connection to the transmission rate capable on the modem connection. The system also provides second transmitting means responsible to the first transmitting means and the decoding means for transmitting the billing identification to the voice-band network such that the voice-band call is billable to the first user's billing account.

The above objects and other objects, features, and advantages of the present invention are readily apparent from the following detailed description of an illustrative embodiment for carrying out the invention when taken in connection with the accompanying drawings.

PACKET SWITCHED CONNECTION EMBODIMENTS

Figure 3A:
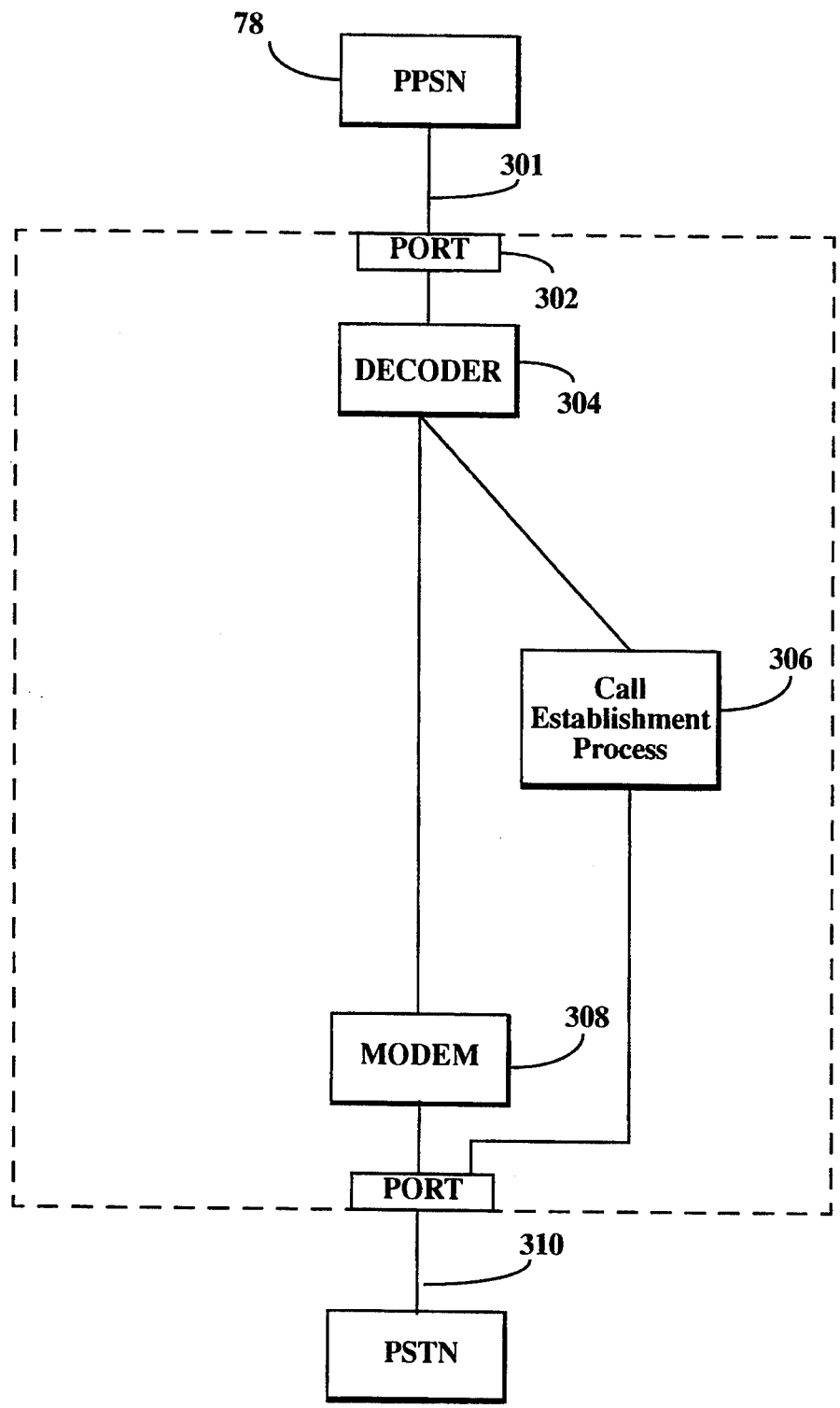
FIG. 3a depicts one embodiment of a Network Access Device for use in interconnecting packet switched connections in accordance with that aspect of my invention.
Figure 3:
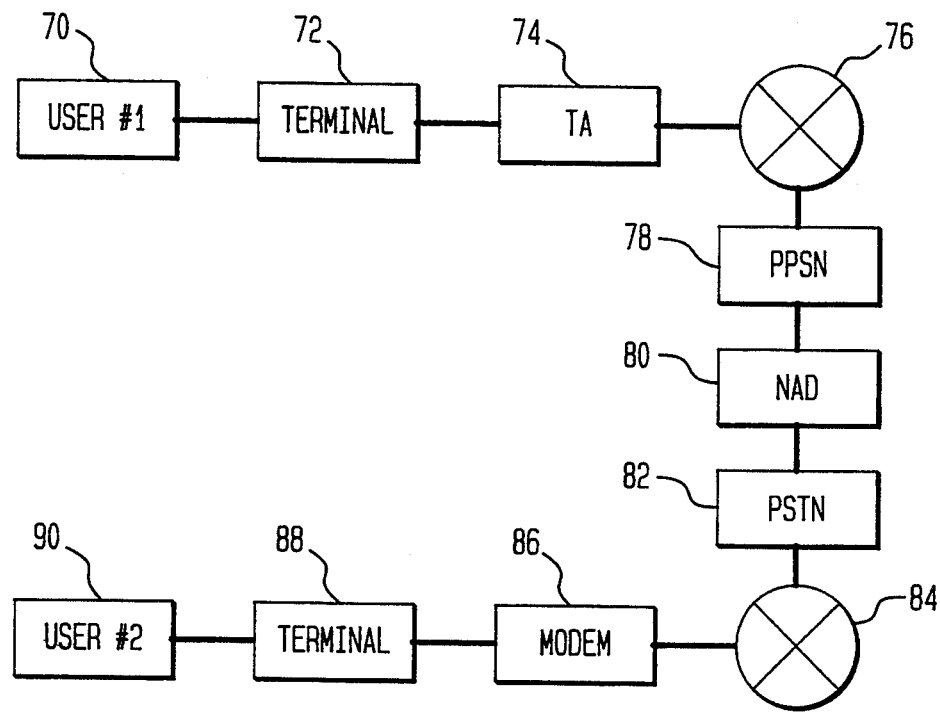
FIG. 3 is a block diagram representation of one embodiment of the method and system of connecting a first user on a packet network to a second user on a voice-band network of the present invention.

The present invention solves the problems presented by the prior art with the configuration shown in FIG. 3. In this scenario a first user 70 on a packet network, such as ISDN, makes a data connection via terminal 72 and terminal adaptor 74 through ISDN end office switch 76 and the regional company PPSN 78 to a device that will be referred to as a Network Access Device (NAD) 80. The NAD 80 emulates a modem and makes a voice connection over the voice-band network such as the PSTN 82 to the second user 90 via end office switch 84, modem 86, and terminal 88.

The packet network may consist of one or more switches that terminate at the Network Access Device 80. This device may directly terminate the packet call or may utilize a Packet Assembled Dissembler (PAD) in the packet network and handle only asynchronous traffic. The NAD 80 will terminate the call and act as a modem by translating the digital data stream to a stream that is compatible with the switched voice-band network.

The key element to this solution is the operation of the NAD 80. Its interface to the packet network (the PPSN 78 as illustrated in FIG. 3) requires a protocol which includes in the packet format the ISDN user's billing identification which corresponds to a billing account for the user of the packet network. For instance, the NAD decodes the ISDN user's telephone number from one or more of the data packets provided by the PPSN, forwards that number over the Primary Rate Interface (or PRI) as the calling party number. This will instruct the PRI end-office to bill the ISDN user for the voice-band call. Therefore, the costs of the voice-band call are allocated to the initiating party. The NAD 80 as depicted in FIG. 3 contains the operational structures as depicted in FIG. 3a. As a packet connection request arrives at the NAD 80 from the PPSN 78 over PRI interface 301 at ISDN port 302, the packet connection request message is decoded at decoder 304 to extract the ISDN user's billing account number. The call establishment process 306 initiates a voice band call at port 312 over the primary rate interface 310 to the PSTN 314 by using a standard call establishment request message with one change; the billing identification number extracted from the decoder is placed into the call establishment request message as a substitute for the calling party number usually included therein. Upon establishment of the voice band call over interface 310, the packet data received at port 302 and forwarded to decoder 304 is transmitted to modem 308, where is translated into modem compatible form and then transmitting through port 312 over interface 310 to its ultimate destination.

Figure 1:
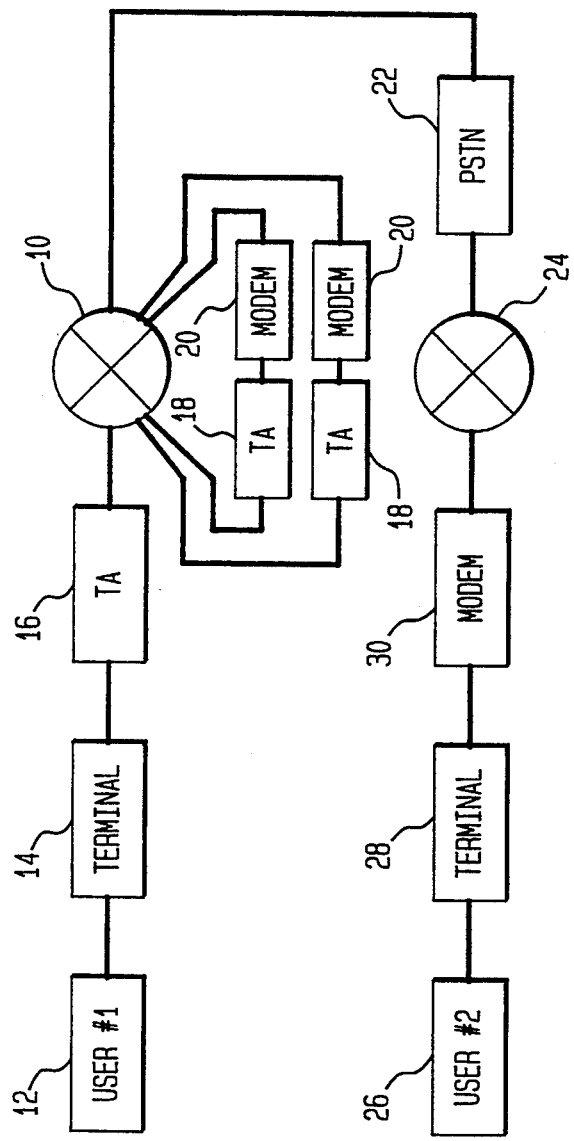
FIG. 1 is a block diagram representation of a prior art method of connecting a first user on a packet network to a second user on a voice-band network.
Figure 2:
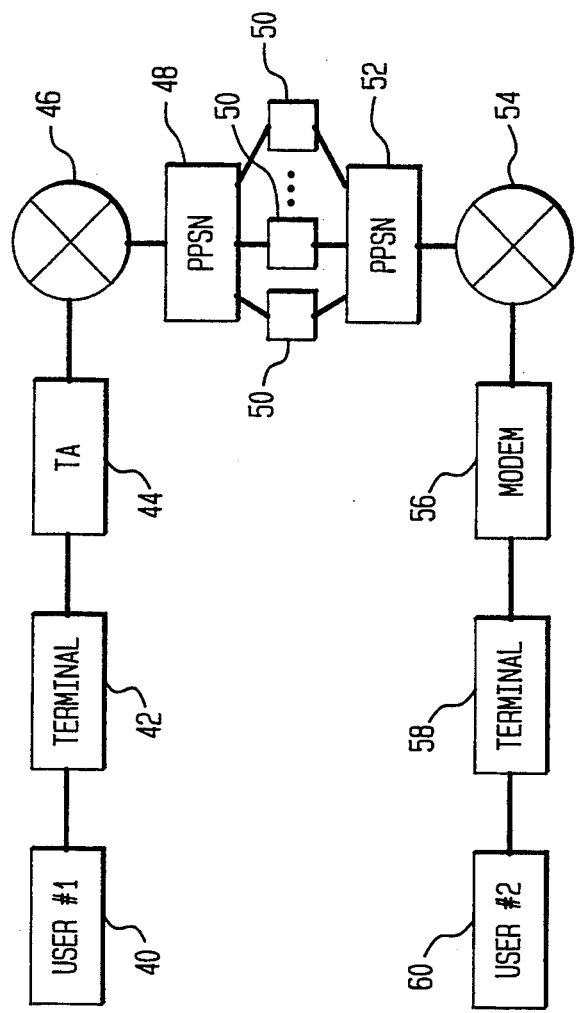
FIG. 2 is a block diagram representation of an alternate prior art method of connecting a first user on a packet network to a second user on a voice-band network.

The system and method of the present invention offers the following advantages:

1) This kind of modem pool is lower cost than previous systems because it replaces arrays of modems and terminal adapters with a single device;

2) The present invention costs less than the prior art method shown in FIG. 1 because it allows the consolidation of the modem pools in a single location where the utilization of the individual modems are higher and fewer overall modems are required. There is no need for each packet network end office switch to have a corresponding modem pool;

3) The present invention avoids the billing problems with FIG. 2 by allowing the individual ISDN user to be billed for both the packet part of the call as well as the voice-band part of the call. This cost allocation conforms to accepted telephone network billing practices and avoids the loss of billing revenues for the voice-band portion of the call. It also allows the network to open packet user availability to users whose access requires a voice-band toll call as opposed to the prior art method presented in FIG. 2; and 4) The present invention allows for single-stage dial-out by using an escape code to route the call through the modem pool to the POTS user. Thus, the packet user avoids the inconvenience of having to initiate a packet call to a modem and then the initiation of voice-band call to the second user.

An example of a packet communication protocol which supports the transfer of the packet user's billing identification is the CCITT Packet Switched Network Standard X.25 protocol (see Data Communication Networks: Services and Facilities, Interfaces, The International Telegraph and Telephone Consultative Committee Blue Book, Volume Vii-Fascicle VII.2, 1989). The X.25 standard relates to an interface between data terminal equipment DTE) and data circuit-terminating equipment (DCE) for terminals operating in the packet mode on public data networks. It provides a precise set of procedures for communications between DTE and DCE for terminal equipment operating in a packet environment.

The X.25 standard defines three functional layers: the physical layer which outlines the physical, functional and electrical characteristics of the DTE/DCE interface; the link layer which describes the link access procedures for data interchange between DCE and DTE; and the packet layer which describes packet format and control procedures for exchange of packets between the DTE and DCE.

The packet layer of the X.25 protocol specifically provides for call initiation by means of a Call Request Packet. This packet enables the calling DTE to request the opening of a logical channel. The calling DTE designates the channel number based upon a set of original assignments that were made when the user subscribed to the network. This information can include billing information on the packet user such as the telephone number or other billing identification and account information. The Call Request packet also informs the network of the calling DTE's address and of the called DTE's address. Until the call is disconnected, the network retains the addresses of both devices associated with the logical channel number.

A second protocol which could provide the function of transferring the packet user's billing identification to the NAD is the X.75 protocol (see Data Communication Networks: Services and Facilities, Interfaces, The International Telegraph and Telephone Consultative Committee Blue Book, Volume VII-Fascicle VII.2, 1989). The X.75 standard relates to an interface between packet switched networks. Many public packet switched data networks have already implemented the X.75 protocol.

X.75 is similar to X.25 in that it specifies procedures for the physical, link and packet levels. Signal Terminal Equipment (or STE), which acts as the bridge node between networks implements the X.75 procedures.

Referring again to FIG. 3, the NAD's 80 interface to the PPSN 78 would require a protocol such as the X.25 or X.75 riding on a RS232, DS0 or preferably a T1 physical interface. The NAD would then need to terminate this packet connection, emulate a modem, and launch a voice-band call to the POTS user 90 using a PRI interface.

The Primary Access System built by Primary Access Corp. San Diego, Calif. and "The System" produced by Hypercom, Inc. can currently perform the aforementioned NAD functions. These systems provide an interface between data terminal equipment and the PSTN by means of T1 network lines. These systems combine the functionality of intelligent channel banks, matrix switching, and digital signal processor-based software definable modems for access to digital network services. With appropriate software, either of these systems could be programmed to perform the NAD functions as described above.

Referring again to FIG. 3 the operation of the NAD 80 is as follows. The NAD sets up a voice call (after it receives a packet call initiated by first user 70) over the PRI interface to the first switch in the voice network 82. That network 82 switches the call to the modem 86 associated with terminal 88.

In this scenario, an outbound call would be initiated by terminal 72, and the TA 74 would set up a packet call through a packet network 78 to the NAD 80. Upon receiving the call, the NAD would translate the packet data to a modem compatible form, and set up a voice-band call to the modem 86 associated with terminal 88 and second user 90. When the call is completed, data transmission can commence.

In the reverse direction, second user 90 using terminal 88 and model 86 can set up a voice-band call to the NAD via the switched voice-band network 82. The NAD 80 (upon receiving the call) will set up a packet call to terminal 72 (and first user 70) via the packet network 78.

The NAD 80 (on outbound calls) can pass the originating telephone number (the number associated with user 70 and terminal 72) to the voice-band network 82. If the NAD is connected to the voice-band network via a PRI line, then the voice network switch can generate a bill for the voice band call and charge it to the phone number associated with user 70 and terminal 72. This is a non-obvious method of generating a bill since there are now two end offices that can bill a single terminal for a voice call. In fact, if that terminal has a simultaneous voice call up when it is using the dial out procedure, it would get billed for both voice calls.

Further, it should be noted that the NAD 80 can screen calls both inbound and outbound (see screening process 316 in FIG. 3a). It can have a table look up that allows only certain packet network customers to connect to the voice-band network. Further, the NAD 80 can control the end points to which a packet network user is allowed to connect. Thus, if it is desirable to limit a user's access to, for instance, certain regions of the country, this can be implemented by software which screens an outbound call by area code. Further, access by packet users to the voice-band network can be limited by screening an outbound call by its originating telephone number or other billing identification.

As a further function, the NAD 80 could translate the dialed numbers for remote dialing or for single-stage dialing. This eliminates the need for a user to first dial the model pool and then to dial the destination number.

In addition, the method and system of the present invention remove the need to have a modem pool at each central office. One NAD could be used to serve several central offices via private lines, a packet network or other means.

Figure 4:
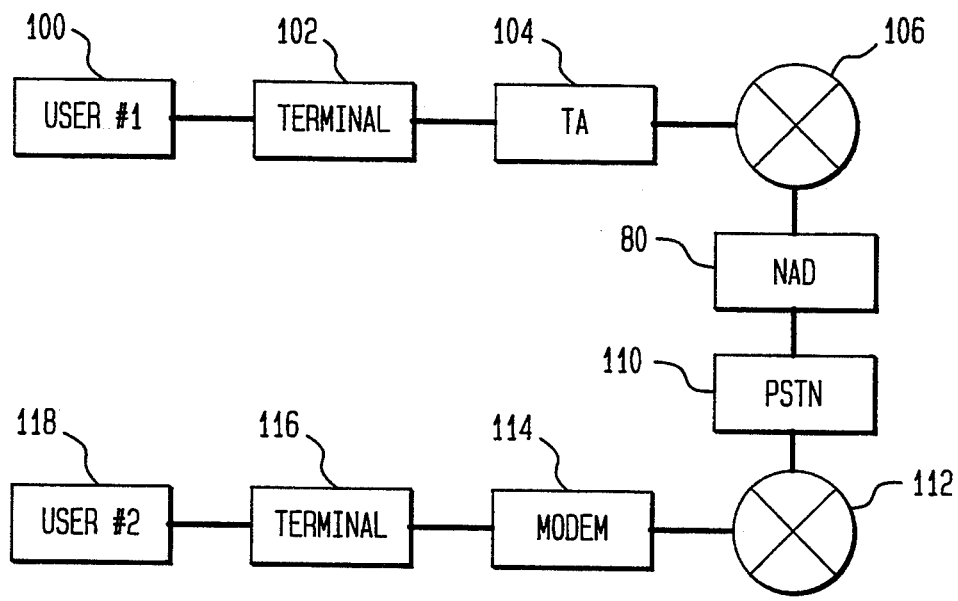
FIG. 4 is a block diagram representation of a first alternate embodiment of the method and system of connecting a first user on a packet network to a second user on a voice-band network of the present invention.

It should be noted that the present invention could be implemented in several architectural variants. One such alternative embodiment is presented in FIG. 4. First user 100 accesses the NAD 80 by means of terminal 102, terminal adaptor 104 and packet network end office switch 106. The NAD 80 initiates a voice-band call over PSTN 110 to effectuate communications with second user 118 via terminal 116, model 114, and voice-band network end office switch 112.

In this embodiment, individual ISDN switches can be connected to the NAD via dedicated lines if the PPSN is not available or if there are few ISDN switches in a particular LATA.

Figure 5:
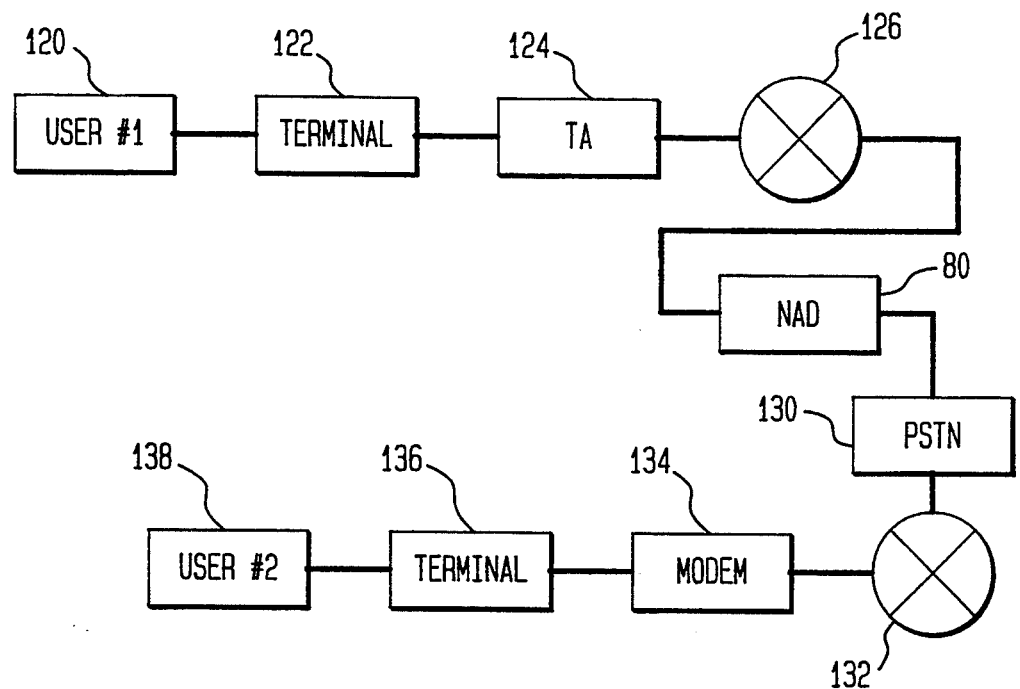
FIG. 5 is a block diagram representation of a second alternative embodiment of the method and system of connecting a first user on a packet network to a second user on a voice-band network of the present invention.

A second alternative embodiment of the present invention is presented in FIG. 5. The PRI end-office and the ISDN end-office are the same switch 126, with the NAD 80 dedicated to this switch. The user 120, terminal 122 and terminal adaptor 124 send data to the NAD 80 via switch 126 which initiates the voice-band call on voice-band network 130 to user 138 via terminal 136, modem 134 and switch 132.

Figure 6:
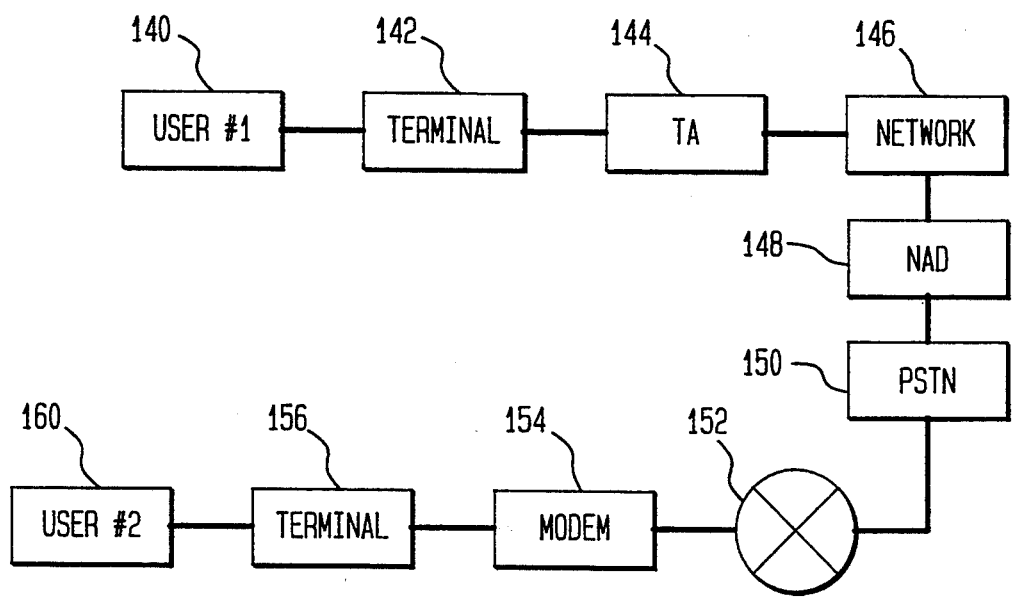
FIG. 6 is a block diagram representation of a third alternative embodiment of the method and system of connecting a first user on a packet network to a second user on a voice-band network of the present invention.

A third alternative embodiment of the invention is shown in FIG. 6. This embodiment demonstrates the connection of a first user 140 connected to a packet network 146 via terminal 142 and terminal adaptor 144. This packet network could be a Local Area Network (or LAN) for example an ethernet or a token ring network, or a Wide Area Network (or WAN), for example FDDI or an Asynchronous Transfer Mode (ATM) network such as SONET, a Metropolitan Area Network or MAN) or a Personal Area Network (or PAN). The NAD 148 provides an interface between the first user 140 on the packet network 146 and second user 160 connected to the voice-band network 150 via end office switch 152, modem 154, and terminal 156.

One with ordinary skill in the art will recognize that the packet networks discussed throughout this application are not limited to the ISDN, X.25 and X.75 packets primarily discussed. These packet networks could be any of the wide variety of LANs, WANs, MANs or PANs operating on any of a wide variety of packet protocols.

CIRCUIT SWITCHED CONNECTION EMBODIMENT

Figure 7:
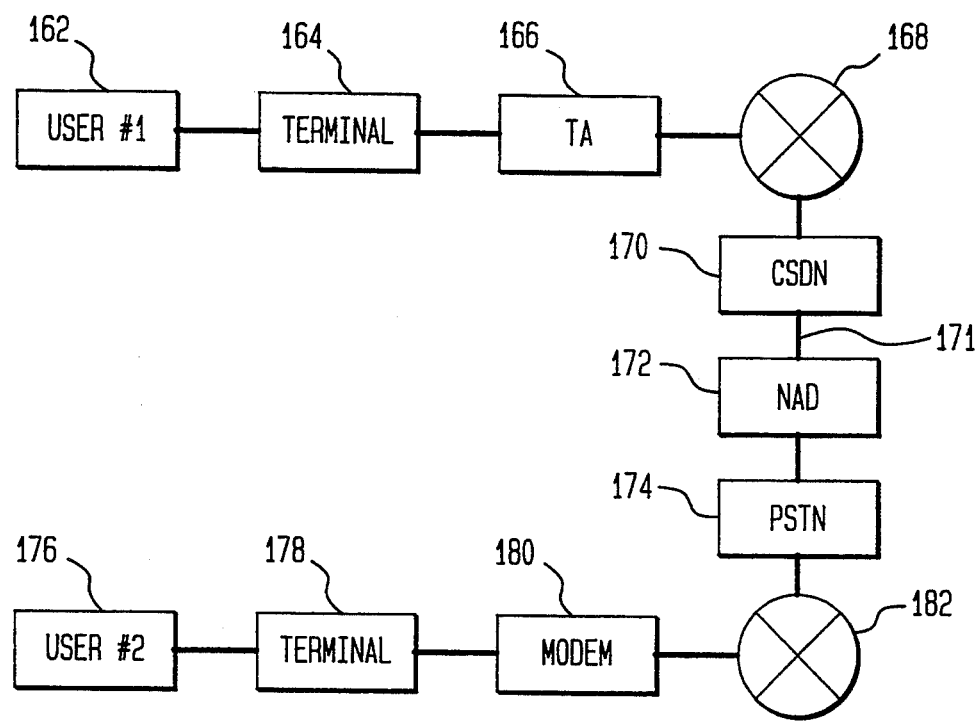
FIG. 7 is a block diagram representation of a further embodiment of the method and system of connecting a first, user on a circuit switched digital network to a second user on a voice-band network of the present invention

The present invention also solves the problems presented by the prior art with the alternative configuration shown in FIG. 7 for circuit switched connections. In this scenario a first user 162 requiring a digital data connection makes a data connection via terminal 164, and terminal adaptor 166 through ISDN end office switch 168 and the regional company circuit switched digital network (CSDN) 170 to a device that will be referred to as a Network Access Device (NAD) 172. The NAD 172 emulates a modem and makes a voice connection over the voice-band network such as the PSTN 174 to the second user 176 via end office switch 182, modem 180, and terminal 178.

The circuit switched digital network may consist of one or more ISDN switches that terminate at the Network Access Device 172 on an ISDN Primary Rate Interface (PRI) 171. The NAD 172 will terminate the call and act as a modem by translating the digital data stream to a stream that is compatible with modem transmission over the switched voice-band network. The NAD would employ a rate adaption protocol such as V.120 [Series V Recommendations, The International Telegraph and Telephone Consultative Committee Blue Book, Volume VIII—Fascicle VIII.1, November 1988] to adapt the transmission rate of the digital data stream from the circuit switched digital network to a speed compatible with the modem transmission between the NAD 172 and modem 180.

The key element to this solution is the operation of the NAD 172 which is similar to the NAD described above for the packet scenario except that the incoming interface is an ISDN Basic Rate (BRI)or Primary Rate Interface (PRI) instead of the X.75 interface. The PRI between the circuit switched digital network (the CSDN 170 as illustrated in FIG. 7) and the NAD 172 includes a signalling protocol on the ISDN signalling channel that identifies the ISDN user's billing identification. When the NAD 172 receives the circuit-switched call from the ISDN user 162 over the call set-up message within the signalling channel on the PRI 171, it would extract the phone number of User #1 from the PRI and use that number as the calling party number when establishing the voice-band call over the PSTN 174. This would cause the PSTN to bill the voice band part of the call to the ISDN user that originated the call instead of billing the NAD which is what would happen in the absence of my invention. This process and function are similar to the packet switched scenario described earlier where the calling party's number is extracted from the X.75 packet message instead of from the signalling protocol in the ISDN PRI signalling channel as in the present case.

Single stage dialing is accomplished in a manner similar to the packet switched scenario. The ISDN user in establishing the call can use escape code dialing or the extended number address field within call setup signalling packets on the ISDN signalling channel to indicate the phone number of User #2 on the PSTN. The NAD 172 would extract User #2's telephone number from the extended number address field and use that number to establish the connection from the NAD to User #2's terminal 178.

Figure 8:
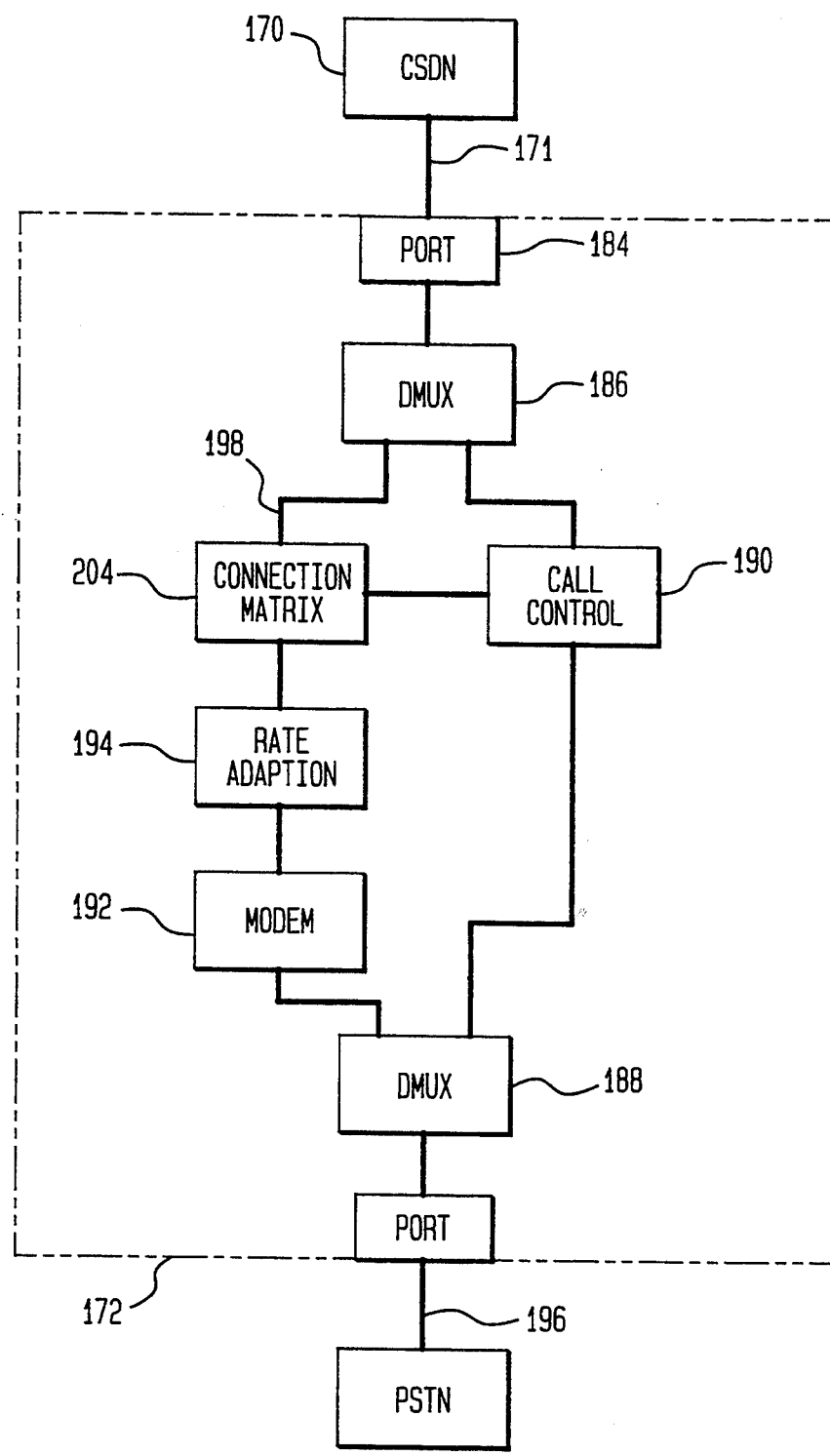
FIG. 8 depicts one embodiment of a Network Access Device in accordance with my invention for circuit switched connections.

FIG. 8 illustrates one embodiment of a NAD 172 in accordance with my invention. The NAD 172 would have a port 184 for interfacing with the CSDN 170 over a Primary Rate Interface (PRI) 171. The port would connect the interface to a demultiplexing processor 186 which would separate the signalling channel from the other channels on the PRI 171. The processor 186 would forward the signalling information to call control processor 190 which would extract from the call set-up message the originating callers billing identification number, the phone number for the destination of the connection, and the channel ID for channel 198 on the PRI 171 over which the circuit switched data will be transmitted. The control process 190 would invoke a demultiplexing processor 188 to establish a voice band call 196 over the PSTN to the destination identified by the call control processor 190. The call establishment control process would connect, via connection matrix 204, the appropriate channel 198 on the PRI 171 to a rate adaption process 194 (illustratively identified above a rate adaption protocol V.120) connected to modem 192, which would adapt the transmitted data rate over the PRI channel 171 to the transmission rate of the newly established voice band connection on PRI 196. The call control process 190 would then forward all the necessary billing information to the PSTN when it set up the voice-band call over PRI 196. The billing systems embedded within the PSTN would then charge the costs of the voice band call over PRI 196 to the billing ID forwarded by call control processor 190 for the originating ISDN caller.

It should further be noted that the method and system of the present invention may be implemented in a wide variety of different manners, including non-ISDN packet switched and circuit switched interworking scenarios, encompassing many alternatives, modifications, and variations which are apparent to those with ordinary skill in the art. Accordingly, the present invention is intended to embrace all such alternatives, modifications, and variations as fall within the spirit and broad scope of the appended claims.

We claim:

1. A method for connecting and billing a first user on a packet network being capable of transmitting packet communications, the first user having a billing identification corresponding to a billing account, to a second user on a voice-band network, the voice-band network being capable of allocating the costs of a voice-band call, the method comprising the steps of:

decoding a data packet from a packet communication initiated by the first user to determine the first user's billing identification;

establishing a voice-band call to the second user over the voice-band network; and transmitting the billing identification to the voice-band network for use by the voice-band network to allocate the cost of said voice band call to the first user's billing account.

2. The method of claim 1 wherein the first user's billing identification is the first user's telephone number.

3. The method of claim 1 further comprising the step of screening the first user's billing identification to determine if a connection on the voice-band network is authorized.

4. The method of claim 1 further comprising the step of screening the first user's billing identification to determine if a connection to the second user is authorized.

5. A system for connecting and billing a first user on a packet network being capable of transmitting packet communications, the first user having a billing identification corresponding to a billing account, to a second user on a voice-band network, the voice-band network being capable of allocating the costs of a voice-band call, the system comprising:

decoding means connected to the packet network for receiving data packets associated with the first user's packet communications and for decoding said data packets to determine the first user's billing identification;

first transmitting means responsive to the decoding means for establishing a voice-band call to the second user over the voice-band network; and second transmitting means responsive to said decoding means and said establishing means for transmitting the billing identification to the voice-band network for use by the voice-band network to allocate the cost of said voice band call to the first user's billing account.

6. The system of claim 5 wherein the billing identification is the first user's telephone number.

7. The system of claim 5 wherein the first network is an ISDN network.

8. The system of claim 5 wherein the voice-band network is a public switched telephone network.

9. The system of claim 5 further comprising screening means in communication with the decoding means arid the first transmitting means for screening the first user's billing identification to determine if a connection on the voice-band network is authorized.

10. The system of claim 5 further comprising screening means in communication with the decoding means and the first transmitting means for screening the first user's billing identification to determine if a connection to the second user is authorized.

11. A method for providing data communication between a first user on an integrated digital services network, the first user having a billing identification corresponding to a billing account, and a second user on a voice-band network, the voice-band network being capable of allocating the costs of a voice-band call, the method comprising the steps of:
receiving a call establishment message containing data information from the first user;
decoding the call establishment message to determine the first user's billing identification;
establishing a voice-band call to the second user over the voice-band network for transmission of data information from the first user in a modulated format; and
billing first user's billing account for the call established over the voice band network according to said first user's billing identification.

12. The method of claim 11 wherein the call establishment message is a data packet transmitted over an X.75 interface to a network access device connected to the public switched telephone network.

13. The method of claim 11 wherein the call establishment message is a call setup request sent on an ISDN signalling channel within an ISDN interface connected to a network access device further connected to the public switched telephone network.

14. The method of claim 11 wherein the first user's billing identification is the first user's telephone number.

15. The method of claim 11 further comprising the step of screening the first user's billing identification to determine if a connection on the voice-band network is authorized.

16. The method of claim 11, further comprising the step of screening the first user's billing identification to determine if a connection to the second user is authorized.

17. A system for providing data communication between a first user on an integrated digital services network, the first user having a billing identification corresponding to a billing account, and a second user on a voice-band network, the voice-band network being capable of allocating the costs of a voice-band call, the system comprising:
receiving means for receiving a message containing the first user's billing information;
decoding means responsive to the receiving means for decoding said message to determine the first user's billing identification;
first transmitting means responsive to the decoding means for establishing a voice-band call to the second user over the voice-band network for transmission of data in a modulated format;
second transmitting means for adapting and then transmitting over said voice-band network in a modulated format the first user's data received by said receiving means; and
billing means responsive to the first transmitting means and the decoding means using the extracted billing identification such that the cost of said voice band call is allocated to the first user's billing account.

18. The system of claim 17 wherein the receiving means receives a data packet over an X.75 interface wherein said data packet contains billing information from the first user.

19. The system of claim 18 wherein the billing identification is the first user's telephone number.

20. The system of claim 18 wherein the first network is an ISDN network.

21. The system of claim 18 wherein the voice-band network is a public switched telephone network.

22. The system of claim 18 further comprising screening means in communication with the decoding means and the first transmitting means for screening first user's billing identification to determine if a connection on the voice-band network is authorized.

23. The system of claim 18 further comprising screening means in communication with the decoding means and the first transmitting means for screening the first user's billing identification to determine if a connection on to the second user is authorized.

24. The system of claim 17 wherein the receiving means receives a circuit switched data call set-up packet on a signalling channel over an ISDN interface.

25. The system of claim 24 wherein the second transmitting means employs a rate adaption protocol for adapting the transmission rate for the data received from said first user to the transmission rate of the modulated data over the voice-band connection.

26. The system of claim 25 wherein said rate adaption protocol is rate adaption protocol V.120.

* * * * *